United States Patent [19]
Ushio et al.

[11] 4,359,379
[45] Nov. 16, 1982

[54] PROCESS FOR FLUID CATALYTIC CRACKING OF DISTILLATION RESIDUAL OILS

[75] Inventors: Masaru Ushio, Yokohama; Tohru Morita; Takeshi Ishii, both of Kawasaki, all of Japan

[73] Assignee: Nippon Oil Company, Ltd., Japan

[21] Appl. No.: 217,129

[22] Filed: Dec. 16, 1980

[30] Foreign Application Priority Data

| Dec. 21, 1979 | [JP] | Japan | 54-165659 |
| May 7, 1980 | [JP] | Japan | 55-59473 |
| Jul. 31, 1980 | [JP] | Japan | 55-104295 |
| Jul. 31, 1980 | [JP] | Japan | 55-104296 |
| Aug. 8, 1980 | [JP] | Japan | 55-108222 |
| Aug. 8, 1980 | [JP] | Japan | 55-108223 |

[51] Int. Cl.$^3$ .................................... C10G 11/18
[52] U.S. Cl. ............... 208/120; 208/52 CT; 208/86; 208/88; 208/113; 209/38; 252/411 R; 252/414
[58] Field of Search ............ 208/113, 120, 52 CT; 252/411 R, 414; 209/8, 38, 39, 40

[56] References Cited

U.S. PATENT DOCUMENTS

| 2,348,418 | 5/1944 | Roesch et al. | 208/52 CT |
| 2,471,078 | 5/1949 | Ogorzaly | 208/52 CT |
| 2,635,749 | 4/1953 | Cropper et al. | 209/127 |
| 2,688,401 | 9/1954 | Schmitkons et al. | 209/172 |
| 2,775,607 | 12/1956 | Kölbel et al. | 252/414 X |
| 3,463,310 | 8/1969 | Ergun et al. | 209/8 |
| 3,926,789 | 12/1975 | Shubert | 209/8 |
| 4,267,032 | 5/1981 | Burk et al. | 208/113 |
| 4,276,149 | 6/1981 | Chester et al. | 208/120 |
| 4,289,605 | 9/1981 | Bartholic | 208/113 |
| 4,290,919 | 9/1981 | McKay et al. | 208/52 CT |

Primary Examiner—Delbert E. Gantz
Assistant Examiner—G. E. Schmitkons
Attorney, Agent, or Firm—Wenderoth, Lind & Ponack

[57] ABSTRACT

A process for fluid catalytic cracking of a starting oil selected from the group consisting of a distillation residual oil, a solvent deasphalted oil derived therefrom and a hydrodesulfurized oil derived therefrom, which comprises withdrawing a part of catalyst particles circulating through a fluid catalytic cracking unit, sending the withdrawn catalyst particles by means of a carrier fluid selected from the group consisting of air, nitrogen, steam and the mixtures thereof at a rate of 0.01 to 100 meters/second in a particle concentration of 0.01 to 500 g/liter to a high gradient magnetic separator in which a ferromagnetic matrix is placed in a uniform high magnetic field to generate a high magnetic gradient around the matrix, thereby separating the withdrawn catalyst particles into a group of particles rendered magnetic by the deposition of at least one metal selected from the group consisting of nickel, vanadium, iron and copper which are contained in the starting oil and a group of non-magnetic particles; and returning the non-magnetic particles to the fluid catalytic cracking unit for re-use.

9 Claims, No Drawings

PROCESS FOR FLUID CATALYTIC CRACKING OF DISTILLATION RESIDUAL OILS

BACKGROUND OF THE INVENTION

This invention relates to a fluid catalytic cracking process using a distillation residual oil, its solvent-deasphalted product, or its hydrodesulfurized product as a starting oil.

Fluid catalytic cracking, known simply as FCC in the art, is a process whereby a petroleum hydrocarbon as a raw material is cracked by contact with a fluidized catalyst to obtain a product the major portion of which consists of gasoline, liquefied petroleum gases, alkylating materials and middle distillates.

Usually, a gas oil is used as a starting oil in fluid catalytic cracking. The gas oil, as used herein, denotes a heavy gas oil from an atmospheric distillation unit, distillates such as vacuum gas oils from a vacuum distillation unit, or the hydrogenation products thereof. It has a boiling point in the range of 220° C. to 600° C. and a specific gravity of about 0.8 to 1.0.

In recent years, while crude oils produced have tended to contain heavy components, there has been a relatively increasing demand for hydrocarbon oils containing fractions having a boiling point lower than the gas oil in view of the environmental problem or the ease of utilization. Hence, use of the gas oil alone as a raw material of FCC has given rise to a problem from the standpoint of raw material resources. In order to save energy, too, effective utilization of residual oils has become an important problem. Attempts have therefore been made to use residual oils as a raw material for FCC.

In the FCC of a residual oil, a particularly well-known phenomenon is the deposition of nickel, vanadium, iron and copper contained in the starting oil on the catalyst. Usually, crude oils contain 5 to 500 ppm of nickel, 5 to 1500 ppm of vanadium, 1 to 100 ppm of iron, and 0.1 to 10 ppm of copper. Since the starting oil, on contact with transporting, storing and processing apparatuses, tends to dissolve the iron of the apparatuses, the actual content of iron in the starting oil greatly exceeds the above-mentioned value. Furthermore, since these metals tend to remain in the bottom during the distillation, the residual oil contains these metals in amounts 2 to 4 times as large as those of the starting oil. In some cases, the residual oils may contain as high as 1000 to 2000 ppm of vanadium.

These metals usually exist as organic metal compounds including porphyrin-like compounds. These compounds are decomposed on contact with the catalyst at high temperatures, and the metals deposit on the catalyst. The deposited metals reduce both the activity and the selectivity of the catalyst. These metals have a hydrogenating-dehydrogenating activity, and under the reaction conditions of FCC, accelerate dehydrogenation of hydrocarbons. As a result, the amounts of undesirable hydrogen gas and coke increase, and the yields of the desired LPG, gasoline, kerosene and gas oils decrease.

Deposition of metals which exert an adverse effect on the reaction is not so important a problem in the FCC of gas oils. For the gas oils contain small amounts of these metals, and the amounts of metals deposited on the catalyst are generally small. Moreover, the amount of the catalyst required to be exchanged can be small. In fact, in the FCC of a gas oil, adverse effects of metal deposition on the catalyst can be avoided by simply supplying a fresh catalyst in an amount corresponding to that of the catalyst which naturally is carried over from the apparatus.

Since, however, the amounts of metals deposited are very large in the FCC of residual oils having a high metal content, a special means is necessary in order to retain the activity and selectivity of the catalyst. It is the usual practive to maintain the activity of the catalyst at a certain fixed level by periodically or steadily withdrawing a part of the catalyst to exchange it with a fresh catalyst or a reactivated catalyst (for example, reactivated by an ion exchange method or an oxidation-reduction method). However, the amount of the catalyst to be withdrawn should be very large, and such a means is economically very disadvantageous. Accordingly, the problem of metal deposition on the catalyst is especially serious in the FCC of residual oils having a high metal content.

It is this problem which the present inventors have attempted to solve.

SUMMARY OF THE INVENTION

We separated a catalyst withdrawn from the circulating system in the FCC of a residual oil into magnetic particles and non-magnetic particles by a high gradient magnetic separator, and evaluated the activities of the withdrawn catalyst, the magnetic particles and the non-magnetic particles in a fixed-bed microreactor. Consequently, we have found that the non-magnetic particles, the withdrawn catalyst and the magnetic particles, in this order, exhibit a progressively higher conversion, and a progressively higher selectivity for formation of LPG, gasoline, kerosene and gas oils, and therefore, marked differences in catalytic activity exist among the three materials.

It has also been found that by returning the nonmagnetic particles to the circulating system of the FCC unit, they can be re-used without adverse effects on the conversion and selectivity.

The present invention provides, on the basis of the above discovery, a novel FCC process which permits much saving of the amount of the make-up catalyst.

According to this invention, there is provided a process for FCC of a starting oil selected from the group consisting of a residual oil, a solvent deasphalted oil derived therefrom and a hydrodesulfurized oil derived therefrom, which comprises withdrawing a part of catalyst particles circulating through a FCC unit, sending the withdrawn catalyst particles by means of a carrier fluid selected from the group consisting of air, nitrogen, steam and the mixtures thereof at a rate of 0.01 to 100 m/second in a particle concentration of 0.01 to 500 g/liter to a high gradient magnetic separator in which a ferromagnetic matrix is placed in a uniform high magnetic field to generate a high magnetic gradient around the matrix, thereby separating the withdrawn catalyst particles into a group of particles rendered magnetic by the deposition of at least one metal selected from the group consisting of nickel, vanadium, iron and copper which are contained in the starting oil and a group of non-magnetic particles; and returning the non-magnetic particles to the FCC unit for re-use.

The catalyst particles rendered magnetic are referred to in the present application as "magnetic particles" which denote a material attracted by a magnetic force to the surface of the matrix placed in the magnetic field in the high gradient magnetic separator. The "non-magnetic particles" denote a material which has passed out of the system of the high gradient magnetic separator without being attracted to the surface of the matrix.

DETAILED DESCRIPTION OF THE INVENTION

In the process of this invention, a residual oil, a solvent deasphalted oil derived therefrom or a hydrodesulfurized oil derived therefrom is used as a starting oil, and is subjected to FCC by contacting it continuously with a fluidized catalyst in a reaction zone of an FCC unit. This contacting is effected in a fluidized bed of catalyst, or by the so-called riser cracking method in which both the catalyst particles and the starting oil rise together through a pipe while reacting. The reaction conditions are those which are normally empolyed in the catalytic cracking of petroleums. Specifically, the reaction temperature is 480° and 550° C., the reaction pressure is 1 to 3 kg/cm$^2$.G, and the contacting time is 1 to 10 seconds. The catalyst/oil ratio is maintained at from 1 to 20.

The catalysts may be those which are usually employed in the catalytic cracking of petroleums. For example, it can be a silica-alumina catalyst containing about 15 to about 20% by weight of alumina, or a silica-alumina catalyst containing about 5 to about 50% by weight of zeolite. The catalyst is in the form of fine particles which have a particle diameter of usually 1 to 1000 μm, preferably 5 to 200 μm.

The yields and properties of the products obtained by the catalytic cracking vary depending upon the composition of the starting oil, the type of the catalyst and the reaction conditions. Approximately, however, the yield of gasoline as a main product is 40 to 60% by volume, and 15 to 25% by volume of cracked gases, 20 to 40% by volume of cracked gas oils, and 3 to 8% by weight of coke are obtained.

The mixture consisting of the reaction product formed as a result of catalytic reaction in the reaction zone, the unreacted material and the catalyst is generally fed thereafter into a stripping zone where most of hydrocarbons including the desired products, the unreacted material, etc. are removed. The catalyst on which a carbonaceous material and heavy hydrocarbons are deposited is sent continuously from the stripping zone to a regenerating zone. In the regenerating zone (regenerator), the catalyst is subjected to oxidation treatment in order to remove the carbonaceous material and hydrocarbons deposited on it, and while being maintained in the fluidized state, it is usually subjected to combustion treatment at a temperature of 560° to 650° C. using air. The catalyst so treated in the regenerating zone is continuously circulated in the reaction zone.

In the FCC process of this invention, a part of the catalyst circulating between the reaction zone and the regenerating zone is withdrawn from an exit of the stripper or the regenerator or from another suitable site which does not adversely affect the operation of the unit. Withdrawing of the catalyst for exchange may be performed continuously, or intermittently at certain intervals which do not adversely affect the resulting product. This withdrawing of a part of the catalyst for exchange is effected in order to prevent the reduction of the catalytic activity as a result of deposition of nickel, vanadium, iron and copper contained in the starting oil, and the consequent decrease in the yields of gasoline, kerosene, and gas oil fractions and the consequent increase in the yields of the coke and hydrogen.

The novel feature of the process of this invention is that when the withdrawn catalyst is to be exchanged with a fresh catalyst or a reactivated catalyst, the withdrawn catalyst is separated by a high gradient magnetic separator into magnetic particles and non-magnetic particles, and the non-magnetic particles still retaining high activity and selectivity are returned to the FCC unit whereby the increase of coke and hydrogen in the product is inhibited, and as the result the amount of the makeup catalyst is saved while the reduction of the reaction conversion is prevented.

The high gradient magnetic separator (to be abbreviated "HGMS" hereinbelow) is a magnetic separating device which is designed such that a matrix made of a ferromagnetic material is placed in a uniform high magnetic field to generate a very high magnetic gradient around the matrix, and is adapted to attract ferromagnetic or paramagnetic fine particles to the surface of the matrix and separate them from weekly paramagnetic fine particles or diamagnetic fine particles. Usually, the ferromagnetic matrix is an assembly of ferromagnetic fine filaments such as steel wool or steel net having a diameter of 1 to 1,000 μm.

HGMS itself is known, and SALA-HGMS manufactured and sold by SALA company of Sweden may be cited as an example.

Separation of the withdrawn catalyst be HGMS is achieved by sending the catalyst particles together with a carrier fluid to HGMS, and passing them through its magnetic field.

The carrier fluid is selected for freedom from deleterious effects on the catalyst as well as for economy and safety, and in the process of this invention, air, steam, nitrogen, or the mixtures thereof are used.

Usually, the strength of the magnetic field, the gradient of the magnetic field, the concentration of the catalyst particles, the linear velocity of the carrier fluid, and the treating temperature are the process variables in operating HGMS. The optimum values of the process variables vary greatly depending upon the particle diameter of the catalyst, the kind, state and amount of the deposited metals, the intended separation level, and the selectivity of separation.

The strength of the magnetic field denotes the strength of the magnetic field in which the ferromagnetic matrix is placed. It is usually 1,000 to 20,000 gauss or higher, preferably 2,000 to 20,000 gauss.

The gradient of the magnetic field denotes the differential with the distance of the strength of the magnetic field generated around the matrix. It can be varied by changing the strength of the magnetic field or the type and diameter of the matrix. A detailed description of the magnetic field gradient is given, for example, in John A. Oberteuffer, IEEE Transactions on Magnetics, p. 223, vol. Mag-10, No. 2, (1974).

In the process of this invention, a very high magnetic field gradient of, say, $2,000 \times 10^3$ to $20,000 \times 10^3$ gauss/cm is required. It has previously been known to use a drum-type magnetic separator for separation of ferromagnetic particles having a relatively large particle diameter in magnetic ore dressing, etc. The drum-type magnetic separator has a magnetic field strength of about 500 gauss and a magnetic field gradient of about 500 gauss/cm which are much lower than the magnetic field strength and magnetic field gradient of HGMS used in this invention. Such a drum-type magnetic separator can remove iron dust included as an impurity as a result of corrosion or wear of the apparatus, but is useless in separating the metal deposited catalyst which has been used in the FCC of heavy petroleums.

The concentration of the catalyst particles denotes the concentration of catalyst particles in the carrier fluid. It is usually 0.01 to 500 g/liter, preferably 0.1 to 100 g/liter.

The linear velocity of the carrier fluid is the linear velocity of the carrier fluid passing through the magnetic field. By varying this linear velocity, the level of separation and the selectivity of separation can be varied greatly. It is usually 0.01 to 100 m/sec, preferably 0.1 to 50 m/sec.

The treating temperature denotes the temperature of the catalyst particles to be separated magnetically. Strictly, it refers to the temperature of nickel, vanadium, iron or copper deposited on the catalyst particles. Preferably, the treating temperature is below the Curie temperature of such a metal. Usually, it is room temperature.

The matrix made of a ferromagnetic material in the HGMS is preferably a net-like matrix such as a steel net. A suitable net-like matrix is, for example, an expanded metal made of stainless steel. The diameter of the filament of the net-like matrix is preferably 10 to 1,000 μm, more preferably 50 to 700 μm, and its mesh opening size is preferably 3 to 80 mesh, more preferably 5 to 50 mesh. The net-like matrix may consist of two or more nets laminated. In some case, spacers may be placed between the net-like matrices to laminate them at certain distance. The diameter of the filaments of the net-like matrix has closely to do with the magnetic field gradient, and generally, the magnetic field gradient increases with decreasing filament diameter.

HGMS may be used on or off the FCC unit. The withdrawn catalyst is separated by the HGMS into magnetic particles on which great amounts of nickel, vanadium, iron and copper are deposited and non-magnetic particles on which these metals are not deposited in great amounts. The weight ratio of the magnetic particles to the non-magnetic particles may range from 1:1000 to 1000:1. Preferably the separation is effected by keeping this weight ratio at from 1:100 to 100:1.

The amounts of the metals deposited on the magnetic particles vary depending upon the type of the catalyst used in the FCC reaction, the desired product, the reaction conditions, etc. In terms of nickel equivalent, it is 0.05 to 20% by weight, preferably 0.1 to 5% by weight. The nickel equivalent, as referred to herein, is a value expressed by the following equation.

Nickel equivalent = [Ni] + 0.25 × [V] + 0.1 × [Fe] + 0.1 × [Cu]

(where [Ni], [V], [Fe] and [Cu] respectively represent the concentrations (% by weight) of nickel, vanadium, iron and copper)

The separated non-magnetic particles are returned to the FCC unit for re-use because they contain relatively small amounts of the deposited metals and still have high activity and selectivity. Usually, destruction of the fluidization balance and the reduction of the catalytic activity are prevented by making up an amount, equal to the separated magnetic particles, of a fresh catalyst or reactivated catalyst to make the amount of the catalyst within the FCC unit the same as that before withdrawal. The site of charging the catalyst into the FCC unit may be an inlet of the regenerator, an exit of the regenerator, a transfer line, or other parts which do not adversely affect the thermal balance and fluidization balance.

The magnetic particles after magnetic separation may be discarded, or may be reused after removing the deposited metals from the particles by ion exchange, chlorination, sulfidation, carbonylation, oxidation, reduction, etc. In performing this reactivation, a reactivating unit may be used on or off the HGMS.

As stated hereinabove, the process of this invention is characterized by the fact that in performing FCC of a starting oil having a high metal content, a part of the catalyst circulating between the reaction zone and the regenerating zone is withdrawn, and is separated by the HGMS into a group of magnetic particles and a group of non-magnetic particles, and that only the magnetic particles are exchanged with a fresh catalyst or reactivated catalyst, while the non-magnetic particles are returned to the FCC unit for re-use. This brings about the advantage that the amount of the make-up catalyst can be markedly decreased in comparison with a prior art method in which the entire catalyst withdrawn is exchanged with a fresh catalyst or reactivated catalyst.

The amount of the circulating catalyst to be withdrawn varies depending upon the type of the starting oil, the type of the catalyst, the desired products, the reaction conditions, etc., and may be suitably determined according to these factors. Generally, the amount of the catalyst withdrawn per day is 3 to 300%, preferably 10 to 100%, of the amount of the catalyst inventory of the FCC unit.

The starting oil used in the process of this invention is a residual oil, a solvent-asphalted oil prepared therefrom, or a hydrodesulfurized oil prepared therefrom.

The residual oil is a residual oil resulting from atmospheric distillation or vacuum distillation of crude oil. The residual oil is a mixture consisting mainly of high-molecular-weight resinous substances, asphaltenes, and relatively low-molecular-weight hydrocarbon components extractable with light hydrocarbons such as propane, butane or pentane, and contains large amounts of heavy metal compounds.

The solvent deasphalted oil is obtained by subjecting the residual oil to the so-called solvent deasphalting treatment which comprises treating the residual oil with such a light hydrocarbon as described above to precipitate the resinous substances and asphaltenes and extract the other components. Since the heavy metal compounds in the residual oil are contained in larger amounts in the resinous substances and asphaltenes which are the extraction residue, the amounts of the metal compounds in the solvent deasphalted oil as an extract are small, but these amounts are much larger than those in a gas oil. Usually, the solvent deasphalted oil contains more than 1 ppm of nickel and vanadium.

The hydrodesulfurized oil prepared from the residual oil is obtained by hydrogenating the residual oil at high temperatures and pressures in the presence of hydrodesulfurization catalyst in order to remove sulfur. A crude oil contains about 0.1 to 4.0% by weight of sulfur although this amount varies depending upon the kind of the crude oil. This sulfur tends to be concentrated in the residual oil as a result of distillation, etc. Thus, distillation residual oils from the Middle East crude oils contain as much as 2.5 to 4.5% by weight. When a distillation residual oil having a high sulfur content is to be catalytically cracked by a fluid catalyst, the activity of the catalyst is reduced by sulfur. Moreover, sulfur together with the coke deposited on the catalyst undergoes oxidation in the regenerating zone and is converted to an oxide such as sulfur dioxide. Consequently, the waste gas may cause troubles such as air pollution and the corrosion of the apparatus. A method comprising directly desulfurizing the residual oil is known in order to solve this problem. According to this method, 50 to 80% of sulfur can be removed by hydrogenating the oil in the presence of a hydrodesulfurization catalyst. It is said that by using severe reaction conditions, metals in the residual oil can also be removed. However, when it is desired to perform both desulfurization and demetallization, it is firstly necessary to increase the hydrogen consumption, and to make the reaction conditions more severe. Secondly, as a result of removal of metals, the metals may deposit on the hydrodesulfurization catalyst to cause a reduction in the activity and lifetime of the catalyst.

According to the process of this invention, catalyst particles in the FCC unit which have deposited thereon large amounts of metals can be selectively separated as magnetic particles, and therefore removal of metals is unnecessary in the hydrogenation treatment of the residual oil. Consequently, the hydrogen consumption is relatively small, and the reaction conditions are mild. Thus, the life of the hydrodesulfurization catalyst can be prolonged. In the case of a residual oil having a high sulfur content, therefore, it is advantageous to use its hydrodesulfurized product as a starting oil in the FCC process.

In performing the hydrodesulfurization of the distillation residual oil, a reactor of any known type such as a continuous fixed bed, moving bed or fluidized bed may be used. One reactor, or a plurality of reactors connected to each other in series, may be used. Examples of the hydrodesulfurization catalyst are sulfur-resistant catalysts such as a nickel-molybdenum catalyst, a nickel-cobalt-molybdenum catalyst, a cobalt-molybdenum catalyst and a nickel-tungsten catalyst which are supported on such a carrier as alumina or silica-alumina.

The hydrogenation reaction is carried out at a reaction temperature of 300° to 450° C., a pressure of 50 to 250 kg/cm$^2$ and a liquid space velocity of 0.1 to 4.0 hr$^{-1}$ while keeping a hydrogen-to-oil ratio of from 200 to 1500 (vol./vol.).

If desired, a contaminant metal passivation agent (to be referred to as metal passivator hereinbelow) may be added to the starting oil in the process of this invention. The metal passivator is an agent for deactivating metals deposited on the catalyst. Inorganic antimony compounds and organic antimony compounds are known as the metal passivator, and any of these can be used in this invention. Examples of the inorganic antimony compounds are antimony trioxide, antimony trisulfide and antimony trichloride, and examples of the organic antimony compounds are antimony triformate, triphenyl antimony and antimony tris (thioacetate).

The amount of the metal passivator to be added to the starting oil is from 1 to 10,000 ppm by weight. The metal passivator may be added directly to the starting oil before feeding to the FCC unit. Or it may be added to the starting oil from any desired site of the FCC unit.

The addition of the metal passivator to the starting oil has the advantage that the amount of the make-up catalyst required can be decreased in comparison with the case of not adding it. Furthermore, when the metal passivator is added to the starting oil, the amount of deposited metals contained in the magnetic particles separated by the HGMS is much larger than that when no metal passivator is added, provided that the magnetic particles in both cases have the same activity level. Consequently, the magnetic field strength during separation can be lower, and the amount of electric power used for generating a magnetic field can be saved.

The withdrawn catalyst may be directly subjected to the separation in HGMS, but if desired, it may be pre-treated prior to the separation. A preferred pre-treatment is a chemical treatment such as oxidation, reduction, sulfidation and halogenation. This chemical treatment acts substantially on metals deposited on the catalyst. One or a combination of two or more treatments may be performed, or the same treatment may be performed two or more times.

The oxidation treatment involves treating the withdrawn catalyst while supplying air or oxygen at a temperature of 500° to 800° C. This treatment may be performed in a flow system or a batch system with a fluidized bed, a moving bed or a fixed bed. Preferably, the treatment is carried out with a fluidized bed or moving bed by the flow system.

The reduction treatment comprises treating the withdrawn catalyst with a reducing agent at 200° to 800° C., preferably 300° to 600° C. The manner of treatment is the same as in the oxidation treatment described above. The reducing agent used denotes any of organic or inorganic compounds capable of reducing metals deposited on the catalyst. Hydrogen, carbon monoxide, methanol and aldehydes are especially preferred reducing agents.

The sulfidation treatment involves treating the withdrawn catalyst with hydrogen sulfide or a mercaptan at 200° to 800° C., preferably 300° to 400° C.

The halogenation treatment is carried out using chlorine, thionyl chloride, etc.

When the aforesaid chemical treatment is performed before separation of the withdrawn catalyst, the separation of catalyst particles can be performed under milder conditions and in better selectivity than in the case of not performing the chemical treatment. The chemical treatment has been found to exert no deleterious effects on the conversion and selectivity of the catalyst.

In the process of this invention, the magnetic particles separated from the withdrawn catalyst by HGMS may be discarded. If desired, however, the magnetic particles may be subjected to a treatment of removing metals, and then returned to the FCC unit for re-use. The metal removing treatment may be any of demetallization treatments which are usually performed. Preferably, it is performed, for example, by calcining the magnetic particles in the presence of air or oxygen, and dipping the calcined particles in sulfuric acid at a pH of 0 to 1.0 to dissolve the metals. The catalyst from which the metals have been substantially leached out is then well washed with water, neutralized with aqueous ammonia, etc., and further washed fully with water. The catalyst may be reused after drying and, optionally, ion exchange treatment. In another embodiment, the magnetic particles are calcined in the presence of air or oxygen and then treated with hydrogen sulfide, and thereafter the metals are leached by an acid, followed by washing.

As a result of such a metal removing treatment, the activity of the magnetic particles can be restored to a level close to the activity of a fresh catalyst, and this brings about the advantage that the expensive catalyst used in fluid catalytic cracking can be effectively utilized. The leaching solution after use may be discarded by some method, or may be subjected to various chemical treatments to recover useful metals.

The following examples illustrate the present invention more specifically.

EXAMPLE 1

A Gach Saran atmospheric distillation residual oil having the following properties was catalytically cracked by using a silica-alumina FCC catalyst containing about 5% by weight of zeolite in an FCC pilot unit while exchanging a part of the circulating catalyst in the FCC with a fresh catalyst.

| Starting oil | |
|---|---|
| Specific gravity: | 0.967 |
| Sulfur content: | 2.68% by weight |
| Conradson carbon residue: | 10.93% by weight |
| Nickel content: | 45 ppm by weight |
| Vanadium content: | 225 ppm by weight |

The withdrawn catalyst was separated by the HGMS into magnetic particles and non-magnetic particles under the operating conditions shown in Runs Nos. 1 to 3 in Table 1. The operating conditions in Runs Nos. 1 to 3 were set so that the amount (parts by weight) of the magnetic particles was equal to that of the non-magnetic particles. An expanded metal of stainless steel was used as a matrix in the HGMS, and air was used as a carrier fluid.

The amounts of nickel and vanadium in the withdrawn catalyst, the magnetic particles and the non-magnetic particles were analyzed, and their activities were evaluated using a fixed-bed microreactor. The results are shown in Table 1.

The results of Table 1 show that in all of Runs Nos. 1 to 3, the conversion, carbon producing factor (CPF) and the amount of hydrogen produced of the non-magnetic particles were close to those of a fresh catalyst, and these non-magnetic particles retained activity and selectivity which would be able to re-use.

EXAMPLE 2

The same starting oil as used in Example 1 was catalytically cracked in an FCC pilot unit using a silica-alumina FCC catalyst containing about 5% by weight of zeolite while exchanging a part of the circulating catalyst in the FCC with a fresh catalyst. The fluid catalytic cracking was performed under reaction conditions which would give the product shown in column I of Table 2. The fresh catalyst was required in an amount of 1.5 pounds per barrel of the starting oil.

A HGMS was incorporated in the FCC pilot unit, and the withdrawn catalyst was separated by the HGMS inot magnetic particles and non-magnetic particles. The non-magnetic particles were returned to the circulating system in the FCC and reused. In obtaining the product shown in column II of Table 2 which was nearly the same as that obtained I when the HGMS was not used, the fresh catalyst was required in an amount of 0.8 pound per barrel of the starting oil.

It is seen therefore that the use of HGMS leads to much saving of the amount of the make-up catalyst.

TABLE 2

| | I HGMS not used | II HGMS provided |
|---|---|---|
| Product distribution $H_2S$ (wt. %) | 1.0 | 1.0 |
| $H_2 + C_1 + C_2$ (wt. %) | 1.8 | 1.7 |
| $C_3$ (vol. %) | 6.0 | 5.8 |
| $C_4$ (vol. %) | 8.3 | 8.0 |
| $C_5$ + gasoline (vol. %) | 28.9 | 29.2 |
| Total cycle oil (vol. %) | 55.0 | 55.2 |
| Coke (wt. %) | 13.5 | 13.8 |
| Amount required of the make-up catalyst (pounds/barrel) | 1.5 | 0.8 |

EXAMPLE 3

The catalyst withdrawn in Example 1 was separated into magnetic particles and non-magnetic particles by HGMS under the operating conditions shown in Runs Nos. 4 to 6 in Table 3 so that different proportions of the magnetic particles (the percentages of the magnetic particles based on the amount of the treating catalyst) were obtained. The magnetic particles obtained were analyzed for the contents of nickel and vanadium and also their activities were evaluated. An expanded metal having a filament diameter of 700 μm and a mesh opening size of 10 mesh and made of stainless steel was used, and air was used as a carrier fluid. The results of the experiments together with data for the withdrawn catalyst for comparison are shown in Table 3.

TABLE 1

| | | Run No. 1 | | Run No. 2 | | Run No. 3 | | Withdrawn catalyst | Fresh catalyst |
|---|---|---|---|---|---|---|---|---|---|
| Operating conditions | Filament diameter (microns) of the matrix in HGMS | 400 | | 700 | | 700 | | | |
| | Mesh opening size of the matrix (mesh) | 30 | | 10 | | 10 | | | |
| | Concentration of catalyst particles (g/liter) | 1.0 | | 5.0 | | 20.0 | | | |
| | Velocity of air (m/sec) | 5.0 | | 1.0 | | 3.0 | | | |
| | Magnetic field strength (kilogauss) | 1.0 | | 4.0 | | 20.0 | | | |
| | | M | NM | M | NM | M | NM | | |
| Metal content | Nickel (ppm by weight) | 3800 | 1200 | 3750 | 1250 | 3700 | 1300 | 2500 | 0 |
| | Vanadium (ppm by weight) | 11500 | 3500 | 11250 | 3750 | 11100 | 3900 | 7500 | 0 |
| Micro activity test | Conversion (% by weight) | 35.7 | 74.0 | 35.5 | 73.5 | 35.5 | 73.5 | 59.1 | 80.0 |
| | CPF | 5.85 | 1.40 | 5.75 | 1.41 | 5.70 | 1.45 | 3.02 | 0.75 |
| | $H_2/CH_4$ volume ratio | 3.2 | 0.9 | 3.1 | 0.9 | 3.1 | 0.9 | 2.0 | 0.8 |

(*) M = magnetic particles;
(*) NM: non-magnetic particles.

TABLE 3

|  |  | Withdrawn catalyst | Run No. 4 | Run No. 5 | Run No. 6 |
|---|---|---|---|---|---|
|  | Proportion of the magnetic particles (wt. %) |  | 10 | 30 | 50 |
| Metal content | Nickel (wt. ppm) | 2500 | 4500 | 4100 | 3750 |
|  | Vanadium (wt. ppm) | 7500 | 12100 | 11600 | 11250 |
| Operating conditions | Concentration of catalyst particles (g/liter) |  | 5.0 | 5.0 | 5.0 |
|  | Velocity of the carrier fluid (m/sec.) |  | 5.0 | 3.0 | 1.0 |
|  | Magnetic field strength (kilogauss) |  | 10.0 | 4.0 | 4.0 |
| Evaluation of activity | Conversion (wt. %) | 59.1 | 30.5 | 32.5 | 35.5 |
|  | CPF | 3.02 | 6.15 | 6.05 | 5.75 |
|  | $H_2/CH_4$ volume ratio | 2.0 | 3.8 | 3.5 | 3.1 |

EXAMPLE 4

A solvent deasphalted oil obtained by extracting a Kuwait vacuum distillation residual oil with pentane and having the following properties was used as a starting oil.

| Starting oil |  |
|---|---|
| Specific gravity: | 0.986 |
| Sulfur content (wt. %) | 4.70 |
| Conradson Carbon residue: | 8.9 |
| Nickel content (Wt. ppm): | 12 |
| Vanadium content (wt. ppm): | 28 |

The starting oil was catalytically cracked in an FCC pilot unit using a silica-alumina FCC catalyst containing about 5% weight of zeolite at a low conversion while exchanging a part of the circulating catalyst in the FCC with a fresh catalyst.

The fresh catalyst was required in an amount of 1.1 pounds per barrel of the starting oil in order to obtain the product shown in column I of Table 4.

A HGMS incorporated in the FCC pilot unit, and the withdrawn catalyst was separated by the HGMS into magnetic particles and non-magnetic particles. The non-magnetic particles were returned to the circulating system in the FCC and re-used. The fresh catalyst was required in this case in an amount of 0.6 pound per barrel of the starting oil in order to obtain the product shown in column II of Table 4 which was nearly the same as that when the HGMS was not used.

It is seen therefore that the use of HGMS leads to much saving of the amount of the make-up catalyst.

TABLE 4

|  |  | I HGMS not used | II HGMS provided |
|---|---|---|---|
| Distribution of the products | $H_2S$ (wt. %) | 1.4 | 1.4 |
|  | $H_2 + C_1 + C_2$ (wt. %) | 1.6 | 1.5 |
|  | $C_3$ (vol. %) | 5.4 | 5.6 |
|  | $C_4$ (vol. %) | 7.8 | 7.5 |
|  | $C_5$ + gasoline (vol. %) | 30.0 | 30.8 |
|  | Total cycle oil (vol. %) | 55.0 | 54.5 |
|  | Coke (wt. %) | 13.0 | 13.1 |
| Amount required of the make-up catalyst (pounds/barrel) |  | 1.1 | 0.6 |

EXAMPLE 5

A starting oil composed of a mixture of a vacuum gas oil (26 liters/day) obtained from Kuwait crude oil and a solvent deasphalted oil (10 liters/day) obtained from a vacuum residual oil from Kuwait crude oil was fed at a rate of 36 liters per day into an FCC pilot unit containing 2 kg of a silica-alumina FCC catalyst, and catalytically cracked under usual high-conversion operating conditions. The component oils of the mixture had been subjected to hydrodesulfurization treatment prior to use.

In the catalytic cracking, the reaction temperature was 492° C., and the reaction pressure was atmospheric pressure. The starting oil was charged into the reaction zone of the FCC unit, and the cracked products which came from the reactor were recovered after cooling for liquefaction. The catalyst was continuously sent from the reactor into the regenerator at a rate of 10 kg per hour in order to remove carbonaceous material deposited on the catalyst particles by oxidization with air. The regenerated catalyst particles were continously returned to the reactor and reused.

The properties of the starting oil used in the experiment were as shown in Table 5.

TABLE 5

|  | Vacuum gas oil | Deasphalted oil |
|---|---|---|
| Specific gravity, $d_4^{70}$ | 0.855 | 0.920 |
| Pour point, °C. | 37.5 | 42.5 |
| Viscosity, cst. |  |  |
| at 50° C. | 20.3 | — |
| at 98.9° C. | 5.3 | 49.6 |
| Conradson carbon residue | 0.1 | 2.3 |
| Average molecular weight | 404 | 580 |
| Nitrogen, wt. % | 0.06 | 0.15 |
| Sulfur, wt. % | 0.22 | 0.71 |
| Nickel, ppm by weight | <0.5 | 4.1 |
| Vanadium, ppm by weight | <0.5 | 11.3 |
| Iron, ppm by weight | <0.5 | 0.8 |

While a part of the catalyst circulating within the unit was withdrawn at a rate of about 150 g per day from the regenerator, and 170 g of the fresh catalyst was supplied to the regenerator, the experiment was performed continuously for 21 days. In addition to the catalyst withdrawn at a rate of 150 g per day, a small amount of the catalyst was carried over from the reactor and regenerator together with the cracked products and exhaust gases. The amount of the catalyst kept in the unit 21 days later was 2.1 kg. Thus, it was ascertained that the amount of the catalyst supplied was nearly in equilibrium with the amount of the catalyst withdrawn. After 21 days, the catalyst in the unit was analyzed, and found to contain 252 ppm of nickel, 608 ppm of vanadium and 120 ppm of iron. It was therefore found that by maintaining the amount of the catalyst held in the unit at 2 kg while supplying about 170 g of the fresh catalyst per day, the amount of metals deposited on the catalyst can be maintained at about 980 ppm.

The above experiment was further carried out continuously under the same conditions for 15 days except that the catalyst was withdrawn four times a day in an amount of 500 g each time. The withdrawn catalyst was separated by HGMS, and about 480 g of non-magnetic particles were recovered each time, and again returned to the unit.

Furthermore, the new catalyst was supplied once to the regenerator in an amount of 100 g per day. After 15 days, the catalyst in the device was analyzed, and it was found that the catalyst contained 232 ppm of nickel, 620 ppm of vanadium and 52 ppm of iron.

It is seen from the results obtained that when the process of this invention involving magnetic separation by HGMS is applied, the amount of the make-up catalyst can be decreased to 100 g from 170 g which is necessary in the absence of magnetic separation by HGMS.

The operating conditions of the HGMS, and the results of analysis of the magnetic particles separated by HGMS were as shown in Tables 6 and 7.

The distribution of the products was as shown in Table 8. It is seen that substantially the same products were obtained in both cases.

TABLE 6

HGMS operating conditions

| Process variables | Operating condition |
|---|---|
| Magnetic field strength (kilogauss) | 20 |
| Velocity of air (m/sec) | 0.5 |
| Concentration of catalyst particles (g/liter) | 4 |
| Operating temperature | Room temperature |

TABLE 7

Metals in the magnetic particles

| Kind of metal | Amount deposited (ppm by weight) |
|---|---|
| Nickel | 468 |
| Vanadium | 1100 |
| Iron | 150 |

TABLE 8

Results of the reaction

| | | HGMS not used | HGMS provided |
|---|---|---|---|
| Distribution of products | $H_2 + C_1 + C_2$ (wt. %) | 2.61 | 2.55 |
| | $C_3$ (vol. %) | 11.6 | 11.9 |
| | $C_4$ (vol. %) | 19.7 | 20.2 |
| | $C_5$ + gasoline (vol. %) | 62.3 | 63.1 |
| | Total cycle oil (vol. %) | 18.5 | 17.3 |
| | Coke (wt. %) | 6.7 | 6.3 |
| Amount required of the make-up catalyst (pounds/barrel) | | 1.6 | 0.9 |

EXAMPLE 6

(1) The Gach Saran atmospheric distillation residual oil used in Example 1 was hydrogenated in the presence of a hydrodesulfurization catalyst in a microreactor. The results are shown in Table 9.

TABLE 9

| | | Run No. | | |
|---|---|---|---|---|
| | | 1 | 2 | 3 |
| Reaction conditions | Pressure (kg/cm$^2$) | 150 | 150 | 150 |
| | Hydrogen/oil ratio (vol/vol) | 1000 | 1000 | 800 |
| | Temperature (°C.) | 400 | 400 | 380 |
| | LHSV (hr$^{-1}$) | 0.5 | 1.0 | 1.0 |
| Desulfurization (%) | | 80 | 70 | 70 |
| Nickel removal (%) | | 45 | 30 | 20 |
| Vanadium removal (%) | | 60 | 45 | 35 |
| Catalyst life (liter of oil/gram of catalyst) | | 2.5 | 4.5 | 6.5 |

When the reaction conditions are rendered severe as in Run No. 1, the desulfurization degree increases, but removal of metals tends to occur more readily. When the reaction is carried out so that the desulfurization degree is somewhat decreased as in Run No. 2, the metal removal degree decreases. It is seen from a comparison of Run No. 2 with Run No. 3 that despite the lowering of the reaction temperature, the desulfurization degree remains unchanged and only the metal removal degree decreases. It is noted that the life of the catalyst is greatly affected by the metal removal degree.

(2) The hydrogenated oil obtained as in (1) above was introduced into an FCC pilot unit incorporated with a HGMS, and cracked in the presence of a silica-alumina FCC catalyst containing about 5% by weight of zeolite.

A part of the catalyst circulating in the FCC pilot unit was withdrawn, and separated into magnetic particles and non-magnetic particles by the HGMS. The non-magnetic particles were returned to the circulating system in the FCC and reused. The magnetic particles were exchanged with a fresh catalyst in such a quantity that the same product could be obtained from any of the starting oils in Table 9.

For comparison, the above procedure was repeated in the absence of the HGMS using the starting oil of No. 3.

The results are shown in Table 10.

TABLE 10

| | | Starting oil (*1) | | | Comparison (*2) |
|---|---|---|---|---|---|
| | | 1 | 2 | 3 | |
| Distribution of the products | H$_2$S (wt. %) | 0.2 | 0.3 | 0.3 | 0.3 |
| | H$_2$ + C$_1$ + C$_2$ (wt. %) | 2.1 | 2.1 | 1.9 | 2.0 |
| | C$_3$ (vol. %) | 6.3 | 6.1 | 6.0 | 6.1 |
| | C$_4$ (vol. %) | 8.4 | 8.4 | 8.3 | 8.3 |
| | C$_5$ + gasoline (vol. %) | 31.9 | 31.8 | 31.8 | 31.9 |
| | Total cycle oil (vol. %) | 55.1 | 55.0 | 55.1 | 55.0 |
| | Coke (wt. %) | 10.5 | 10.5 | 10.3 | 10.4 |
| Amount required of the make-up catalyst (pounds/barrel) | | 0.4 | 0.5 | 0.6 | 1.2 |

(*1): The numbers correspond to Run numbers in Table 9.
(*2): FCC was carried out without using HGMS.

It is seen from the results shown in Table 10 that by using HGMS, the amount of the make-up catalyst in FCC can be fully saved without performing metal removal to a considerable extent by hydrogenation treatment.

EXAMPLE 7

In an FCC pilot unit, the same Gach Saran atmospheric distillation residual oil to which 1000 ppm of triphenyl antimony (metal passivator) was added was catalytically cracked in the presence of a silica-alumina FCC catalyst containing about 5% by weight of zeolite.

A part of the circulating catalyst in the FCC was withdrawn, and separated into a magnetic particles and non-magnetic particles by HGMS. The non-magnetic particles were returned to the circulating system and re-used.

For comparison, the above procedure was repeated without adding the metal passivator to the starting oil, and the operating variables of the HGMS were set so that a product much the same as that obtained when the metal passivator was added could be obtained.

It is seen from the results given in Table 11 that the amount required of the make-up catalyst was decreased by the addition of the metal passivator, and that the amounts of metals deposited in the magnetic particles increased markedly to prolong the life of the catalyst. Furthermore, since the amounts of metals deposited were large, the magnetic field strength in magnetic separation could be small, and the electric power used in generating a magnetic field could be saved.

TABLE 11

|  |  | Metal passivator | |
|---|---|---|---|
|  |  | Added | Not added |
| Distribution of the products | $H_2S$ (wt. %) | 1.0 | 1.0 |
|  | $H_2 + C_1 + C_2$ (wt. %) | 1.8 | 1.7 |
|  | $C_3$ (vol. %) | 5.8 | 5.8 |
|  | $C_4$ (vol. %) | 8.0 | 8.0 |
|  | $C_5$ + gasoline (vol. %) | 28.5 | 29.2 |
|  | Total cycle oil (vol. %) | 55.2 | 55.2 |
|  | Coke (wt. %) | 13.3 | 13.3 |
| Amount required of the make-up catalyst (pounds/barrel) |  | 0.5 | 0.8 |
| Magnetic particles | Nickel (ppm) | 7300 | 3750 |
|  | Vanadium (ppm) | 21000 | 11250 |
|  | Iron (ppm) | 18500 | 10200 |
| Operating condition | Magnetic field strength (kilogauss) | 5 | 10 |
|  | Velocity of air (m/sec) | 1.0 | 1.0 |
|  | Concentration of the catalyst particles (g/liter) | 4 | 4 |

EXAMPLE 8

The Gach Saran atmospheric distillation residual oil used in Example 1 was catalytically cracked in the presence of a silica-alumina FCC catalyst containing about 5% by weight of zeolite in an FCC pilot unit.

The catalyst withdrawn from the FCC pilot unit was subjected to reduction treatment by heating it at a temperature of 600° C. for 3 hours in a hydrogen flow. The treated catalyst was then separated into magnetic particles and non-magnetic particles by a HGMS. The non-magnetic particles were returned to the FCC unit and reused.

For comparison, the catalyst withdrawn from the FCC pilot unit but not subjected to reduction treatment was separated into magnetic particles and non-magnetic particles by HGMS. The non-magnetic particles were returned to the FCC unit for re-use. The process variables of HGMS were set so that a product much the same as in the case of performing the reduction treatment of the catalyst could be obtained.

It is seen from Table 12 that when the withdrawn catalyst was chemically treated prior to separation by HGMS, the magnetic field strength can be markedly decreased, and also the amount of electric power used for generating a magnetic field could be saved.

TABLE 12

|  |  | Reduction treatment of the withdrawn catalyst | |
|---|---|---|---|
|  |  | Yes | No |
| Distribution of the products | $H_2S$ (wt. %) | 1.0 | 1.0 |
|  | $H_2 + C_1 + C_2$ (wt. %) | 1.7 | 1.8 |
|  | $C_3$ (vol. %) | 5.8 | 6.0 |
|  | $C_4$ (vol. %) | 8.0 | 8.3 |
|  | $C_5$ + gasoline (vol. %) | 29.2 | 28.9 |
|  | Total cycle oil (vol. %) | 55.2 | 55.0 |
|  | Coke (wt. %) | 13.8 | 13.5 |
| Amount required of the make-up catalyst (pounds/barrel) |  | 0.8 | 0.8 |

TABLE 12-continued

|  |  | Reduction treatment of the withdrawn catalyst | |
|---|---|---|---|
|  |  | Yes | No |
| Magnetic particles (%) |  | 20.5 | 21.1 |
| Non-magnetic particles (%) |  | 79.5 | 78.9 |
| Metal deposited of the magnetic particles | Nickel (ppm) | 4350 | 4500 |
|  | Vanadium (ppm) | 13000 | 12500 |
| Operating conditions | Magnetic field strength (kilogauss) | 5.0 | 20 |
|  | Velocity of air (m/sec) | 2.0 | 2.0 |
|  | Concentration of the catalyst particles (g/liter) | 1.5 | 1.5 |
|  | Operating temperature | Room temperature | Room temperature |

EXAMPLE 9

Fifty grams of each of the withdrawn catalyst, the non-magnetic particles and the magnetic particles obtained in Example 1 were calcined in the air, treated with an acid, neutralized, washed and calcined. Then, they were subjected to an activity test in a fixed-bed microreactor. The results are shown in Table 13.

They exhibited activities close to the activity of the fresh catalyst, and there was scarcely any appreciable difference among the activities of the three. It is therefore seen that the magnetic particles from which metals were removed sufficiently retained activity.

TABLE 13

|  |  |  | After demetallization treatment | | |
|---|---|---|---|---|---|
|  |  | Fresh catalyst | Withdrawn catalyst | Non-magnetic particles | Magnetic particles |
| Micro activity test | Conversion (wt. %) | 80 | 76 | 78 | 76 |
|  | CPF | 0.75 | 0.80 | 0.80 | 0.85 |
|  | $H_2/CH_4$ volume ratio | 0.8 | 0.8 | 0.8 | 0.8 |

When the dissolved metals were recovered in the form of salts from the acid-treating liquor, the amounts of the salts recovered were 4.0 g from the magnetic particles, 1.0 g from the non-magnetic particles, and 2.4 g from the withdrawn catalyst.

It is seen from the results that larger amounts of metals can be recovered from the magnetic particles even when the same treatment was carried out, and that when metal removal treatment is performed only on the magnetic particles, the efficiency of metal removal increases greatly.

What we claim is:

1. A process for fluid catalytic cracking of a starting oil selected from the group consisting of a distillation residual oil, a solvent deasphalted oil derived therefrom and a hydrodesulfurizied oil derived therefrom, which comprises withdrawing a part of catalyst particles circulating through a fluid catalytic cracking unit, sending the withdrawn catalyst particles by means of a carrier fluid selected from the group consisting of air, nitrogen, steam and the mixtures thereof at a rate of 0.01 to 100 meters/second in a particle concentration of 0.01 to 500 g/liter to a high gradient magnetic separator in which a ferromagnetic matrix is placed in a uniform high magnetic field to generate a high magnetic gradient around the matrix, thereby separating the withdrawn catalyst particles into a group of particles rendered magnetic by the deposition of at least one metal selected from the group consisting of nickel, vanadium, iron and copper which are contained in the starting oil and a group of non-magnetic particles; and returning the non-magnetic particles to the fluid catalytic cracking unit for re-use.

2. The process of claim 1 wherein the magnetic gradient is $2,000 \times 10^3$ to $20,000 \times 10^3$ gauss/cm.

3. The process of claim 1 wherein the strength of the magnetic field is 1,000 to 20,000 gauss.

4. The process of claim 1 wherein the ferromagnetic matrix is a steel net having a filament diameter of 10 to 1000 μm and a mesh opening size of 3 to 80 mesh.

5. The process of claim 1 wherein the content of nickel or vanadium in the starting oil is at least 1 ppm by weight.

6. The process of claim 1 wherein a contaminant metal passivating agent is added to the starting oil.

7. The process of claim 1 wherein the withdrawn catalyst particles are pre-treated before they are sent to the high gradient magnetic separator.

8. The process of claim 1 wherein the magnetic catalyst particles are subjected to a demetallization treatment, and then returned to the fluid catalytic cracking unit for re-use.

9. The process of claim 1 wherein the catalyst is a silica alumina catalyst.

* * * * *